April 18, 1967 W. W. CARLIN 3,314,747
RECOVERY OF CHROMATE FROM CHROME MUD WASTES
Filed June 11, 1963
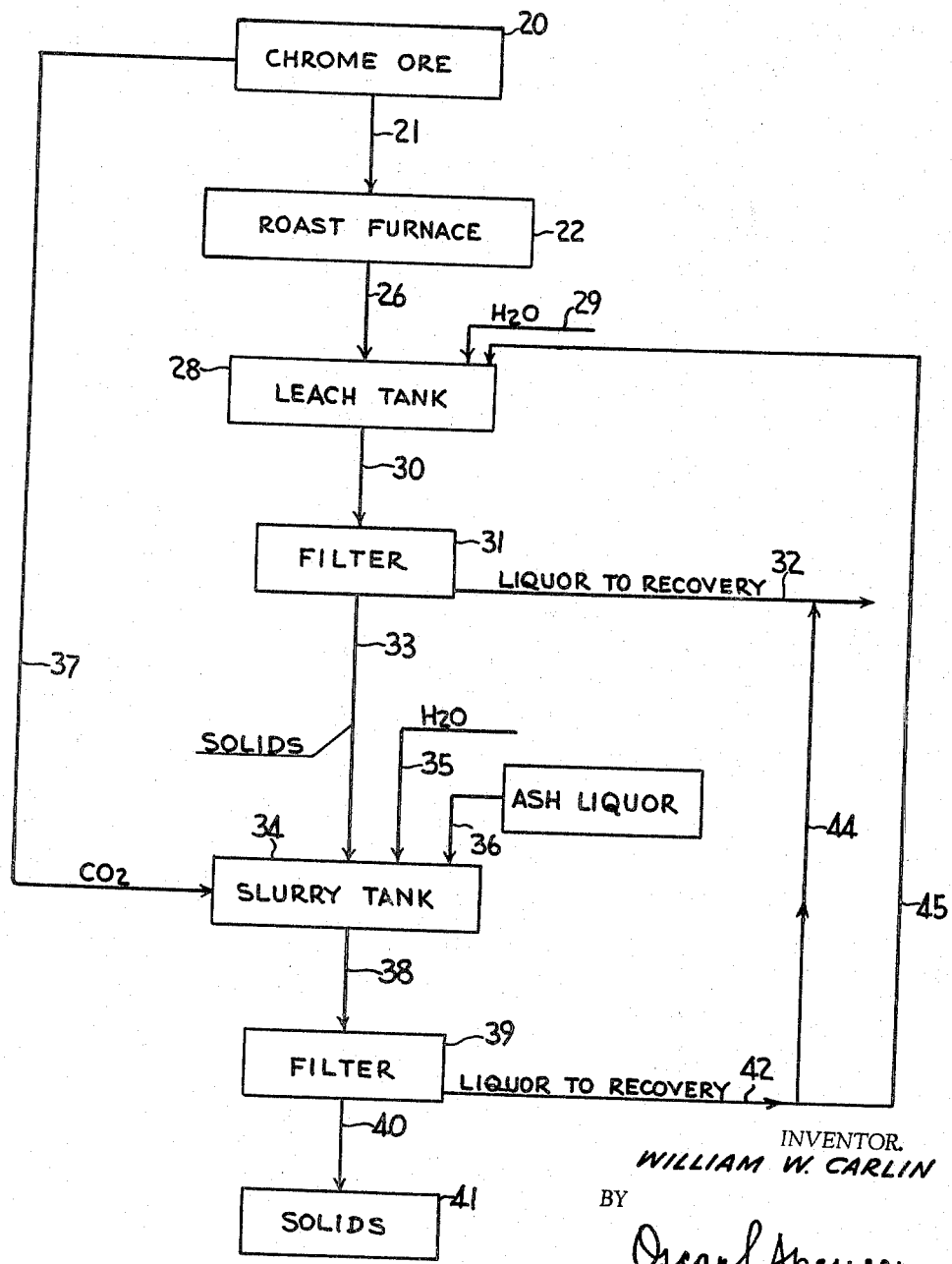
INVENTOR.
WILLIAM W. CARLIN
BY
Oscar L. Spencer
ATTORNEY

United States Patent Office 3,314,747
Patented Apr. 18, 1967

3,314,747
RECOVERY OF CHROMATE FROM CHROME MUD WASTES
William W. Carlin, Portland, Tex., assignor to Pittsburgh Plate Glass Company, Pittsburgh, Pa., a corporation of Pennsylvania
Filed June 11, 1963, Ser. No. 287,055
5 Claims. (Cl. 23—56)

The present invention relates to a method of treating chromium ores and is particularly directed to a method in which improved recoveries of chromium values in a relatively pure state can be achieved.

It is particularly concerned with recovery of chromate in usable form from chrome waste mud obtained from a chrome ore roasting process for the recovery of the chromate content in usable form.

In the manufacture of sodium dichromate and chromic oxide, it is common practice to roast chrome containing ores in a furnace at temperatures with an alkali, usually sodium carbonate, in admixture with lime or some other diluent. The material, after roasting is leached with water, filtered and the chrome containing materials recovered from the raw liquor of the filtering step. When lime is the principal diluent, the solid residue from the leaching or filtering steps in such a process contains considerable quantities of acid soluble hexavalent chromium and small quantities of water soluble hexavalent chromium which cannot be readily recovered. In the overall economics of the process, this chromium material in the solid residue of the leaching step represents a considerable loss, and in addition, also presents a serious waste disposal problem because of the toxic nature of the chromium chemicals therein which are present in the hexavalent state.

Aluminum and vanadium also are common impurities in chromate ores so treated. In the usual processes of the prior art, much of these impurities are dissolved with the leaching solution contaminating the chromate solution and requiring its special purification.

In the practice of the present process, both of these difficulties may be minimized. Thus, alkali chromate leach solution obtained in water leaching the roast contains little or no vanadium or aluminum or in any event insignificant amounts of these impurities. Furthermore, high recovery of chromium values is achieved and the waste mud contains little hexavalent chromium.

By virtue of this process, in addition to recovering substantial quantities of the chromium content of the waste mud in usable form, a serious waste disposal problem is also minimized.

Thus, in accordance with this invention, the solids of the roast after a preliminary leach to produce a concentrated sodium chromate leach solution, a so called waste mud is contacted with carbon dioxide gas either in pure form or diluted with gaseous diluent, preferably containing at least 5 to 20 percent $CO_2$ with careful control of pH. In conjunction with the carbonation of the mud which is usually in an aqueous slurry, an alkali metal carbonate such as sodium carbonate is added thereto in certain definite quantities to provide sufficient sodium ion. The addition of $CO_2$ controls the final pH of the slurry in the range of 7.5 to 10, preferably 8.5 to 9.5. After completion of the carbon dioxide treatment, the slurry is filtered and the chromium content recovered from the filtrate. The remaining solid phase may be recycled to the roasting step for further treatment and digestion, or may be discarded.

The process of this invention is particularly desirable in that it utilizes materials which are produced in the roasting phase of the chrome recovery process and thus renders the overall chrome recovery process considerably less expensive.

For a more complete understanding of the invention, reference is made to the accompanying drawing in which there is diagrammatically illustrated a typical embodiment of the invention in which the waste mud treated is separated after the leaching step and subjected to the treatment in accordance with this invention.

A mixture of chromate ore with lime, and sodium carbonate or sodium bicarbonate is prepared and placed in storage bin 20. A typical mixture has the following composition:

| | Parts by wt. |
|---|---|
| Chrome ore | 40 |
| Calcined lime (CaO) | 34 |
| $Na_2CO_3$ | 26 |

While the exact mixture may vary substantially, high amounts of lime (at least 15 percent by weight of the mixture) are used in order to hold vanadium and aluminum in a form in which they are poorly soluble in the leach solution. Sodium bicarbonate is recycled from a subsequent step in the recovery process in which it is produced along with sodium dichromate upon reaction of sodium chromate with carbon dioxide (see U.S. Patent No. 2,931,704).

Enough alkali (as sodium carbonate and bicarbonate) to react with the chromium in the ore and to supply about 0 to 50 percent excess is added in the form of sodium carbonate.

As illustrated in the accompanying drawing, this mixture is stored in storage bin 20 and is introduced to a roasting furnace 22 through line 21. After roasting the mix in the conventional way, the roasted product is passed into a leaching tank 28. Water is added to the leaching tank through line 29 and the contents of the leaching tank after proper contact therein are discharged through line 30 to a filter generally indicated at 31. The liquor removed from the filtering operation contains 30 to 45 percent by weight of sodium chromate and less than 0.03 percent of aluminum or vanadium. It is passed through line 32 to recovery for the sodium chromate values contained therein. The solid material recovered in the filter 31 is introduced continuously through line 33 to a slurry tank 34.

This mud contains a small amount of hexavalent chromium which is water soluble and a greater amount of hexavalent chromium which is acid soluble. The acid soluble chromium fraction is only difficulty soluble in water. The mud also contains most of the iron, vanadium and aluminum present in the ore.

The slurry tank contains the mud and enough water to slurry the mud, usually making a pulp of 20 to 50 percent solids, a good value being 40 percent by weight. Sodium carbonate solution is fed continuously through line 36 and water through line 35. Carbon dioxide recovered from the roasting operation and containing 5 to 15 percent $CO_2$ is introduced near the bottom of the tank through line 37. The rates of feed of these materials is controlled to hold the pH of the slurry at about 8.5 to 9.5, preferably about 9. As a consequence, the more alkaline mud drops in pH rapidly from a higher value, for example from 10.5 to 12.5 to the pH of the slurry.

Slurry is continuously withdrawn through line 38 and delivered to a filter 39. The solid filter cake is discharged through line 40 to a solids collection tank 41. The filtrate liquor is discharged through line 42 and may be introduced through line 44 into the liquor recovered from the filter 31 for the recovery of the sodium chromate content thereof. More advantageously, however, this filtrate is delivered to leach tank 28 via line 45 for reasons which will be discussed below.

In conducting the process in accordance with this invention, two features are essential to the success of the process. Thus, it is necessary in conducting the process that sufficient sodium carbonate or bicarbonate be present in the carbonation step in order that the hexavalent chromium content of the waste mud be successfully reduced to a solubilized state. This sodium carbonate may be added as such or generated in situ by adding sodium hydroxide to the slurry. In order to accomplish this, the concentration of sodium carbonate present in the slurry tank should be in excess of or approximate the stoichiometric equivalent of the hexavalent chromium in the tank. Some excess sodium carbonate does not hurt the process.

Any suitable carbon dioxide containing gas may be used provided it is not excessively dilute. Carbon dioxide coming from the roasting furance contains about 6 to 15 percent by volume of $CO_2$ and is suitable.

Maintenance of pH of the slurry within proper limits is an essential and central feature of the invention. If the pH falls below 7.5 or is above 10, the resulting solution contains an excessive amount of aluminum and/or vanadium. Moreover, at a pH above 10, difficulty is encountered in obtaining good recovery of the chromium from the mud. Solutions which are adjusted to a pH of 8.5 to 9.5 are the most free from dissolved aluminum or vanadium and the filterability of the slurry proceeds more readily.

By feeding the resulting filtrate back into the first stage leach in tank 28, one can achieve somewhat greater flexibility in the amount of aluminum or vanadium which may be tolerated in the filtrate. In this case, any aluminum or vanadium which is in the filtrate precipitates with the mud in tank 28 so that the solution leaving tank is essentially free of vanadium and aluminum.

As previously stated, the mud is fed directly into the aqueous medium in tank 28 and this drops almost instantaneously in pH to the desired level. This improves the filterability of the resulting residual mud.

It will be understood that the process herein contemplated may be concluded by preparing a mixture of the mud coming from leach tank 7, and sodium carbonate which will have a pH of about 12 to 12.5. In this case the pH gradually falls as carbon dioxide is added. At a pH somewhere between 10 and 11, for example about 10.5, the aluminum dissolves. Thereafter it precipitates in a flocculent form difficult to filter precipitate as the pH drops below 9.5. While this is not fatal to the process, it adds complications. These complications do not appear to arise if the pH of the slurry falls very rapidly from 10.5 to the desired range.

The carbonation process can be conducted effectively in a series of stages in which the solution is fed forward through a series of carbonation tanks and the carbon dioxide fed countercurrently. In each stage, the pH of the slurry is progressively lower, being in the range of 8 to 10, preferably 8.5 to 9.5 in the last stage. In the last stage, however, the feed slurry coming from the earlier stages generally has a pH above about 10.5 and falls rapidly to the final pH as described above.

In conducting the carbonation, it has been found desirable to employ carbon dioxide containing gas streams in which the carbon dioxide content is somewhere between 10 and 60 percent by volume. The utilization of pure carbon dioxide streams while useful, does not produce results which are as desirable as those achieved when weak carbon dioxide streams are employed. In the carbonation step itself, the time of carbonation may vary considerably though it has been found that a carbonation lasting from 2 to 5 hours appears to be optimum. The addition of sodium carbonate as previously stated, is a critical factor in solubilizing and recovering acid soluble hexavalent chromium.

While in this disclosure sodium carbonate is referred to, it should be noted that sodium bicarbonate or sodium hydroxide also can be substituted in whole or in part for sodium carbonate, so long as the final pH is maintained in the desired range specified above.

For a more complete understanding of the present invention, reference is made to the following additional examples which are illustrative of certain modes of operation which may be conducted in accordance with the teachings of this invention.

*Example I*

Utilizing a hexavalent chromium containing waste mud recovered from a leaching operation, a laboratory batch carbonator comprising a Pyrex cylinder 2 and ¾ inches in diameter and 13 inches high was employed. A power stirrer and two gas bubblers were located in the carbonator. The agitator operated near the bottom of the reactor and the gas bubblers were located an inch from the bottom of the reactor. A synthetic gas mixture containing 12 percent by volume $CO_2$ was fed to the reactor from nitrogen and $CO_2$ cylinders and rotameters were used to measure the total volume of mixed gases fed to the reactor. Gas samples were taken of both the feed gases and the exit gases and the $CO_2$ content determined by gas chromophotography. The reactor operated in an oil bath maintained at 60° C. The mud was placed in the reactor at the start of each run as a 25 percent slurry with water, which had been heated to 60° C. and 8 percent by weight (based on the dry mud) of sodium bicarbonate was dissolved in the slurry. The starting mud contained about 9 percent by weight (anhydrous basis) of hexavalent chromium expressed as sodium chromate. Carbonation was continued until the pH of the slurry fell from about 12 to 8.8. The slurry was then filtered and the cake washed. After washing, the filter cake contained only 1.6 percent by weight of hexavalent chromium expressed as above. The filtrate containing the extracted chromium contained negligible concentrations of aluminum, vanadium and calcium.

*Example II*

The process of Example I was repeated using 8 percent by weight of $Na_2CO_3$ in lieu of sodium bicarbonate. The hexavalent chromium in the initial mud was 9.61 percent by weight and the filter cake after carbonation to the same pH and filtration was 1.4 percent. The filtrate contained only negligible concentrations of calcium, aluminum and vanadium.

As shown in the above examples, the applicant by virtue of the present invention has provided a method for easily recovering the hexavalent chromium content of waste mud streams normally encountered in chrome recovery processes where chrome or roasting has taken place. The hexavalent chromium content of such mud streams are converted to soluble materials which can be recovered and utilized in the process or recovered ultimately in usable form.

While the invention has been described with reference to specific examples, it is not intended that it be so limited except insofar as appears in the accompanying claims.

I claim:
1. In a method of producing hexavalent chromium by roasting a chrome ore containing vanadium and aluminum impurities in a furnace with sodium carbonate in admixture with lime, in an amount sufficient for retaining the said impurities water-insoluble, to thereby produce hexavalent chromium and leaching the product of said chrome roast in a first leaching step with water to produce a filtrate and undissolved solids, the improvement comprising separating the filtrate and undissolved solids in a first step, contacting the undissolved solids with gaseous carbon dioxide, said solids being in aqueous slurry, providing in said aqueous slurry, in conjunction with said carbon dioxide treatment, a member selected from the group consisting of sodium carbonate, sodium hydroxide and sodium bicarbonate in an amount at least approximate that stoichiometrically equivalent to the hexavalent chromium present in the slurry, adjusting the pH of the resulting slurry to 7.5 to about 10 by the aforesaid carbon dioxide and added member to thereby prevent vanadium and aluminum from entering the solution, separating solids from the resulting liquor, and recovering chromium values from said liquor.

2. The method of claim 1 wherein the pH of the slurry is maintained between 8.5 and 9.5.

3. The process of claim 1 wherein said resulting liquor is fed into contact with said roasted chrome ore in said first leaching step.

4. A method of treating solid material produced by the water extraction of the product of a roasting of chromate ore containing vanadium and aluminum impurities, with sodium carbonate and lime, in an amount sufficient for retaining the said impurities water-insoluble, at elevated temperature for a period of time sufficient to produce in said chromate ore, hexavalent chromium, comprising establishing an aqueous slurry of the solid material remaining after said water extraction, introducing carbon dioxide and sodium carbonate to said slurry, the amount of said sodium carbonate being at least approximate that stoichiometrically equivalent to the hexavalent chromium present, and maintaining the pH of said slurry at between 7.5 to 10 by the aforesaid introduction of carbon dioxide and sodium carbonate to thereby prevent vanadium and aluminum from entering the solution, separating the solids from the resulting liquor, and recovering sodium chromate values from said liquor.

5. The process of claim 4 wherein the pH of the slurry is held at 8.5 to 9.5.

References Cited by the Examiner

UNITED STATES PATENTS

| | | | |
|---|---|---|---|
| 234,145 | 11/1880 | Pemberton | 23—56 |
| 1,310,720 | 7/1919 | Vis | 23—56 |
| 2,381,236 | 8/1945 | Udy | 23—56 |
| 2,435,304 | 2/1948 | Foerster et al. | 23—56 |
| 2,931,704 | 4/1960 | Hoekje | 23—56 |

FOREIGN PATENTS 11,311    5/1892    Great Britain.

OSCAR R. VERTIZ, *Primary Examiner.*

B. LEVENSON, *Assistant Examiner.*